United States Patent
Deane et al.

(10) Patent No.: US 8,599,815 B2
(45) Date of Patent: *Dec. 3, 2013

(54) METHOD AND APPARATUS FOR PROCESSING MULTIPLE COMMON FREQUENCY SIGNALS THROUGH A SINGLE CABLE USING CIRCULATORS

(75) Inventors: Peter Deane, Fitzroy Harbour (CA); Abdelgader Legnain, Ottawa (CA); Neil McGowan, Stittsville (CA); Marthinus Da Silveira, Ottawa (CA)

(73) Assignee: Apple Inc., Cupertino, CA (US)

( * ) Notice: Subject to any disclaimer, the term of this patent is extended or adjusted under 35 U.S.C. 154(b) by 318 days.

This patent is subject to a terminal disclaimer.

(21) Appl. No.: 12/830,651

(22) Filed: Jul. 6, 2010

(65) Prior Publication Data

US 2010/0272089 A1    Oct. 28, 2010

Related U.S. Application Data

(63) Continuation of application No. 10/642,649, filed on Aug. 19, 2003, now Pat. No. 7,782,827.

(60) Provisional application No. 60/458,012, filed on Mar. 28, 2003.

(51) Int. Cl.
*H04H 20/67* (2008.01)
*H04B 7/216* (2006.01)

(52) U.S. Cl.
USPC .......................................... 370/339; 370/342

(58) Field of Classification Search
USPC .......... 370/339, 342, 276, 320, 335, 441, 479
See application file for complete search history.

(56) References Cited

U.S. PATENT DOCUMENTS 3,742,149 A    6/1973   Yoshida et al.
3,818,365 A    6/1974   Hanson
(Continued)

OTHER PUBLICATIONS

U.S. Appl. No. 10/642,649, Notice of Allowance dated Apr. 19, 2010.

(Continued)

*Primary Examiner* — Hassan Phillips
*Assistant Examiner* — Saba Tsegaye
(74) *Attorney, Agent, or Firm* — Meyertons, Hood, Kivlin, Kowert & Goetzel P.C.; Stephen J. Curran

(57) ABSTRACT

A method and apparatus for processing multiple signals at a common frequency combined into a single radio frequency cable and subsequently recovering the signals without significant losses, distortion, or cross-talk. The method and apparatus includes processing multiple signals at a common frequency fed through a single radio frequency (RF) cable with or without one or more amplifiers and utilized for either forward or reverse link transmissions. The invention enables a single power amplifier to amplify multiple RF signals that occupy a common frequency channel and after amplification splitting these signals into amplified copies of the originals. The amplified signals may be sent to different antenna ports to illuminate different base station sectors if required. The signal splitting function is performed at the antenna masthead such that this method reduces the number of feeder cables running up the antenna tower by a factor of N, where N is the number of common frequency signals (e.g., the number of sectors) amplified by the single power amplifier. This invention enables a single power amplifier to simultaneously provide all the radio frequency signals necessary to feed a general N input phased array antenna system and form multiple antenna beams uniquely for several individual users simultaneously.

27 Claims, 5 Drawing Sheets

(56) References Cited

U.S. PATENT DOCUMENTS

| | | | |
|---|---|---|---|
| 4,161,694 A | 7/1979 | Weber et al. |
| 4,551,727 A | 11/1985 | Cunningham |
| 4,768,187 A | 8/1988 | Marshall |
| 4,839,894 A | 6/1989 | Rudish |
| 5,479,082 A * | 12/1995 | Calvani et al. | 398/85 |
| 5,541,766 A * | 7/1996 | Mizrahi et al. | 359/337 |
| 5,748,669 A | 5/1998 | Yada |
| 5,774,193 A | 6/1998 | Vaughan |
| 5,818,875 A | 10/1998 | Suzuki |
| 6,011,513 A | 1/2000 | Wilson |
| 6,016,371 A | 1/2000 | Wickham |
| 6,178,158 B1 | 1/2001 | Suzuki |
| 6,192,070 B1 | 2/2001 | Poon |
| 6,275,511 B1 | 8/2001 | Pan |
| 6,396,801 B1 | 5/2002 | Upton |
| 6,469,680 B1 | 10/2002 | Kelliher |
| 6,522,642 B1 | 2/2003 | Scott |
| 6,721,506 B1 | 4/2004 | Lam |
| 6,760,342 B1 | 7/2004 | Skones |
| 6,766,150 B1 | 7/2004 | Johnson |
| 7,002,902 B2 | 2/2006 | Proctor, Jr. et al. |
| 2002/0110314 A1 * | 8/2002 | Connolly | 385/24 |
| 2002/0154357 A1 * | 10/2002 | Ozveren et al. | 359/124 |
| 2002/0196488 A1 * | 12/2002 | Myers | 359/109 |
| 2005/0074205 A1 | 4/2005 | Tomita |

OTHER PUBLICATIONS

Chinese Patent Application No. 200480014813.0, Office Action dated Sep. 19, 2008.

* cited by examiner

METHOD AND APPARATUS FOR PROCESSING MULTIPLE COMMON FREQUENCY SIGNALS THROUGH A SINGLE CABLE USING CIRCULATORS

CROSS REFERENCE TO RELATED APPLICATIONS

This application is a continuation of U.S. application Ser. No. 10/642,649 filed Aug. 19, 2003, issued as U.S. Pat. No. 7,782,827, which claims priority from U.S. Provisional Application 60/458,012 filed Mar. 28, 2003.

BACKGROUND OF THE INVENTION

1. Field of the Invention

The present invention relates to the field of radio frequency (RF) transmission and signal processing related thereto. More specifically, the present invention pertains to a method and apparatus for processing multiple signals at a common frequency fed through a single RF cable with or without one or more amplifiers and utilized for either forward or reverse link transmissions.

2. Description of the Prior Art

In the area of RF transmission, many problems exist with regard to cost and reliability of components. This is particularly true when considering typical antenna structures and RF circuitry elements related to such antenna structures. Most antenna structures are inherently inhospitable environments due to their exposure to wind, precipitation, and temperature extremes. Such environmental difficulties often cause premature failure of RF circuitry elements located on antennas, thus necessitating truck rolls and costly technician time. Further, some RF circuitry elements are considered more vulnerable to failure. Still further, placement of RF circuitry elements at or near the antenna masthead presents logistical, if not safety, concerns due to the difficulty of physical access. In instances where removal of the masthead for subsequent repair is the only manner of access, significant system downtime will occur. Accordingly, designers of RF systems are always looking for ways to reduce placement of high power (and relatively low reliability) RF circuitry elements at the antenna and masthead.

In addition to physical considerations, designers of RF systems must also contend with maintaining system losses at a minimum.

Antenna structures within many RF transmission systems that are multi-sectored such as, but not limited to, code division multiple access (CDMA) systems typically include technologies that require a high power amplifier (HPA) for each sector. For purposes of this application, it should be understood that where the term "antenna structure" is used it should be read to include any antenna itself or may also include a tower, building, or similar physical means that supports the given antenna.

Due to the low reliability of the HPA elements, HPAs are normally placed at the base of the antenna structure. As each signal is run through a given HPA, this aspect necessitates multiple runs of RF cabling to antenna ports on the antenna masthead. Often, such multi-sectored systems will also include features such as beam-splitting and directional antenna arrays that further crowd the antenna tower itself with requisite RF cabling. Aside from weight considerations, wind load becomes an increasing concern with the increase of RF cabling. In instances of environmental occurrences such as ice build-up and/or high winds, an abundance of surface area in the form of RF cabling can result in catastrophic failure of the antenna structure.

What is needed therefore is a manner in which costly, high power (but low reliability) RF circuitry elements are eliminated in regards to the antenna-related portion (i.e., masthead) of an RF system such as, but not limited to, a CDMA system. Further, what is needed is a manner in which multiple runs of RF cabling are reduced.

SUMMARY OF THE INVENTION

The present invention provides a method and apparatus for processing multiple signals occupying a common frequency through a single RF cable. The inventive method and apparatus may include one or more HPAs located at the base of the antenna structure for forward link transmission. In the case of reverse link transmissions, the method and apparatus of the present invention would not require HPAs at the base of the antenna structure, but would rather require preamplifiers located at the masthead of the antenna structure. It should be understood that such preamplifiers would be relatively low power and therefore of a suitable reliability for placement at the masthead without compromising the value of the present invention.

In the instance where multiple HPAs are used at the base of the antenna structure with distinct signals (at a common frequency), the HPAs would be located prior to combining the signals and feeding them into a single RF cable. In the alternative instance where a single HPA is used, the single HPA would be located after combining the signals but prior to feeding the combined signals into a single RF cable. Either of these two instances are most suitable for forward link transmission and it should be readily understood that the specific location and placement of one or more HPAs may vary due to the given implementation of the present invention without straying from the intended scope of the instant method and apparatus. Moreover, the existence of even one HPA is not necessitated by the present invention. Rather, the method and apparatus of the present invention is suitable for reverse link transmission where no HPAs are used. In such instance, relatively reliable, low power preamplifiers would be located at the antenna masthead of the antenna structure.

The present invention is operable for forward link transmission by way of combining multiple signals (before or after amplification by one or more HPAs as mentioned above) at the base of an antenna structure, transmitting the combined signal through a single RF cable to the antenna masthead, and de-combining the combined signal prior to transmission of the multiple signals to a set of antenna ports for signal propagation therefrom.

The present invention is operable for reverse link transmission by way of combining multiple signals after pre-amplification using low power amplifiers at the masthead of an antenna structure, transmitting the combined signal through a single RF cable to the base of the antenna structure, and de-combining the combined signal prior to transmission of the multiple signals to a set of input ports (e.g., base-station receiver inputs) for signal transmission therefrom.

The inventive aspect of combining multiple signals within the same frequency and subsequently de-combining such aggregate signal reduces costly high power RF circuitry elements in regards to the antenna-related portion of an RF system such as, but not limited to, a CDMA system with a masthead HPA and RF cabling. Indeed, the present invention is system-independent (i.e., independent of modulation format) in that any RF system transmitting multiple signals at a common frequency over a single RF cable would benefit from the inventive method and apparatus disclosed herein.

The method and apparatus of the present invention is accomplished by way of a modulation/demodulation scheme using Walsh codes and Serrodynes. The Walsh code modulation/demodulation scheme is discussed further hereinbelow. The basic concept within the present invention is the same for either the forward or reverse links. That is to say, forward and reverse link transmissions occurring within the scope of the present invention both include the advantageous aspects of modulating signals having a common frequency, combining such signals so as to pass the combined signal along a single RF cable, and de-combining and de-modulating the combined signal in order to reconstitute the original signals without significant losses, distortion, or cross-talk.

In the instance of forward link transmission, multiple (N) signals having a common frequency are each modulated by a short Walsh code phase sequence by way of a respective phase shifter at each of N inputs. Specifically, the multiple signals are phase shifted according to a short Walsh modulation sequence (of length 4 chips in the illustrated example). The phase-shifted signals are then combined to form an aggregate signal. The aggregate signal is then amplified by way of passing though a single HPA. Alternatively, as mentioned above, these signals may be amplified prior to being modulated by the Walsh code sequences and subsequently combined. This allows the amplified aggregate signal to pass through a single RF cable up the length of an antenna structure. At the antenna masthead, the amplified aggregate signal is demodulated via the appropriate (i.e., Walsh or Serrodyne) modulation scheme (as described in more detail hereinbelow) in conjunction with passing through a series of three-port circulators along with related duplexer filters. Each related demodulated, phase-shifted signal then passes to a predetermined related antenna port for propagation therefrom.

In the instance of reverse link transmission, multiple (N) signals having a common frequency are received at respective antenna ports and then amplified by way of passing though a respective low power preamplifier located at the antenna masthead. Each amplified signal is then modulated by a short Walsh code phase sequence by way of a respective phase shifter. Specifically, the multiple signals are phase shifted according to a short Walsh modulation sequence (of length 4 chips in the illustrated example). The phase-shifted signals are then combined to form an aggregate signal. This allows the amplified aggregate signal to pass through a single RF cable down the length of an antenna structure. At the base of the antenna structure, the amplified aggregate signal is demodulated via the appropriate (i.e., Walsh or Serrodyne) modulation scheme (as described in more detail hereinbelow) in conjunction with passing through a series of three-port circulators along with related duplexer filters. Each related demodulated, phase-shifted signal then passes to a set of input ports (e.g., base-station receiver inputs) for signal reception.

The apparatus of the present invention alternatively includes two modulation/demodulation schemes using either Walsh code modulation or Serrodyne frequency shift schemes. Such schemes are discussed further hereinbelow. Multiple (N) signals having a common frequency are each shifted in phase by way of a respective phase shifter at each of N inputs. Specifically, the multiple signals are phase shifted via either modulation scheme. The phase-shifted signals are then combined to form an aggregate signal. The aggregate signal is then amplified by way of passing though a single HPA. Alternatively, these signals may be amplified prior to being modulated by the Walsh code sequences and subsequently combined. This allows the amplified aggregate signal to pass through a single RF cable along the length of an antenna tower. At the masthead of the antenna tower, the amplified aggregate signal is demodulated via the appropriate (i.e., Walsh or Serrodyne) modulation scheme in conjunction with passing through a series of three-port circulators along with related duplexer filters. Each duplexer filter allows for the related demodulated, phase-shifted signal to pass to a predetermined related antenna port for transmission therefrom.

The method of the present invention includes a method for processing multiple signals at a common frequency including receiving multiple signals having a common frequency, shifting the phase of each one of the multiple signals by a respective phase shift sequence by modulating each signal by either Walsh or Serrodyne modulation schemes, combining the phase-shifted signals to form an aggregate signal, amplifying the aggregate signal, transmitting the aggregate signal across a length of RF cabling, demodulating and filtering the aggregate signal through a series of circulators, duplexers, and demodulators such that the aggregate signal is separated into its constituent signals and filtered to an appropriate antenna port, and transmitting each of the multiple signals from its intended antenna.

While the present invention may be utilized in a manner whereby the method and apparatus may be arranged in order to provide for either signal receiving or transmission as outlined above, for purposes of clarity the example discussed in more detail below will primarily focus on the forward link. It should be well understood that one of ordinary skill in the art of digital signal processing would recognize the reverse link variation to be well within the intended scope of the present invention. As well, one skilled in the art would recognize that a detailed implementation would require circuitry details that are only discussed in general terms below. Again, any such generalities are for the purposes of clarity of illustrating a preferred embodiment of the present invention.

DETAILED DESCRIPTION OF THE INVENTION

The invention will be described for the purposes of illustration only in connection with certain embodiments; however, it is to be understood that other objects and advantages of the present invention will be made apparent by the following description of the drawings according to the present invention. While a preferred embodiment is disclosed, this is not intended to be limiting. Rather, the general principles set forth herein are considered to be merely illustrative of the scope of the present invention and it is to be further understood that numerous changes may be made without straying from the scope of the present invention.

During operation of a CDMA system or any related RF system, one sector corresponding to a multi-sector antenna may reach peak traffic capacity and generally require full power. Conventionally, in a three sector cell for example when three cables are run up an antenna tower and three corresponding HPAs exist to send each signal up the corresponding cable, there is no way that power can be transferred between sectors should one sector require more than the other two. In the present invention, power is effectively shared among the three sectors because the signals are combined and full power is effectively always available for any sector. This is accomplished via the trunking aspect of one HPA and one cable.

Figure 1:
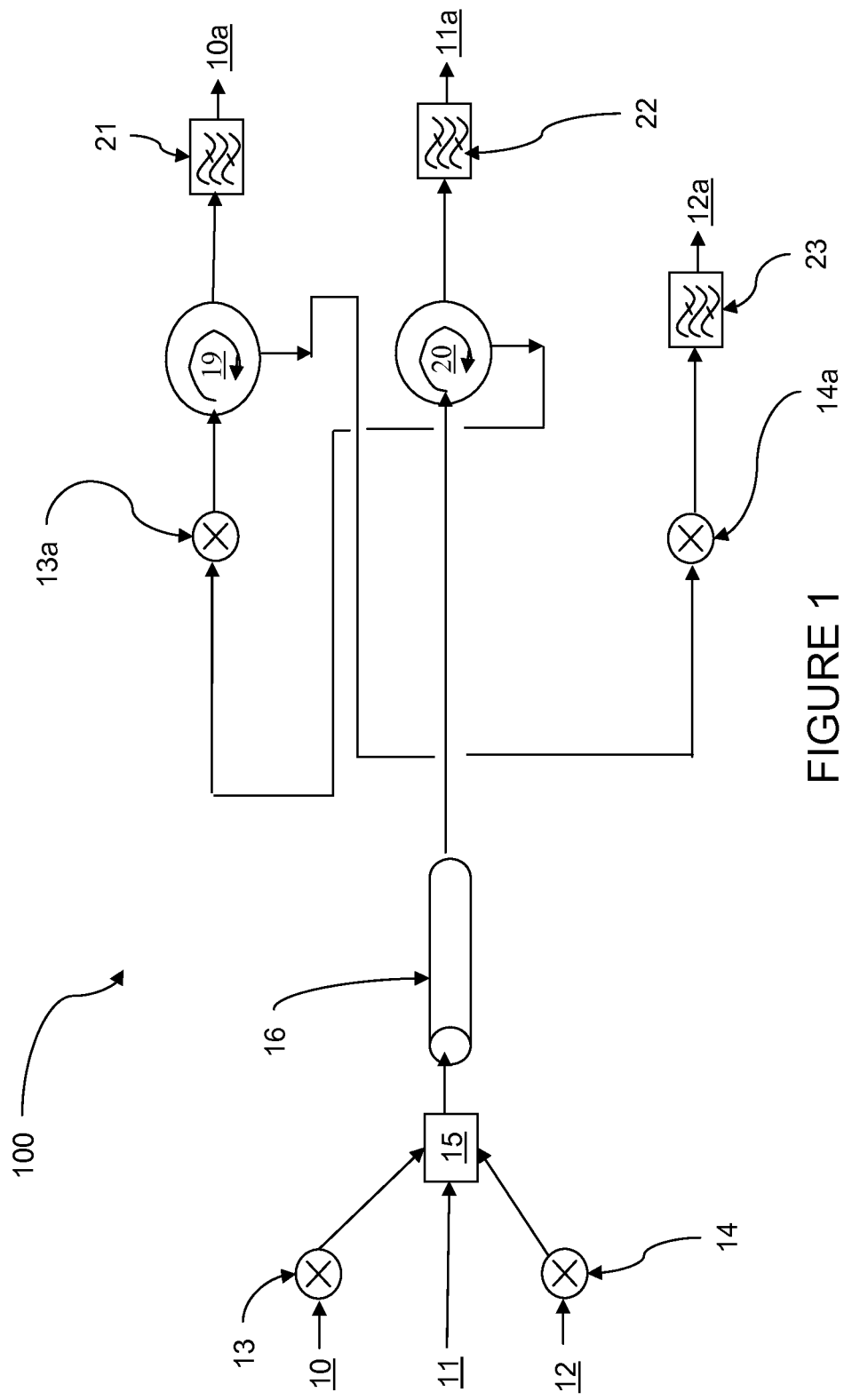
FIG. 1 is a schematic of a first embodiment of the present invention using phase shift modulation via a Walsh code scheme.

With reference to FIG. 1 there is illustrated an example of a first embodiment 100 of the present invention including modulation and demodulation using Walsh codes. For purposes of clarity of illustration, only three signal input channels 10, 11, 12 for corresponding sectors alpha, beta, and gamma are discussed. It should be understood that any number of sectors and corresponding signals (i.e., N number of signals) 10, 11, 12 are possible with the current invention. The three channels (e.g., CDMA forward link sectors or beams) are modulated via Walsh code phase modulators 13, 14. Specifically, beta sector signal 11 is effectively un-modulated as Walsh code 0 does not change the beta sector signal 11. Accordingly, no modulator is shown for the beta sector signal 11. The alpha sector signal 10 and the gamma sector signal 12 both include a corresponding Walsh code modulator 13 and 14, respectively.

Generally speaking, Walsh modulation/demodulation involves the use of Walsh codes to distinguish different signals during transmission. It will be appreciated by those skilled in the art that several different spreading codes exist which can be used to separate data signals from one another in a CDMA communication system. These spreading codes include but are not limited to pseudo noise (PN) codes and Walsh codes. A Walsh code corresponds to a single row or column of the Hadamard matrix. For example, in a 64 channel CDMA spread spectrum system, particular mutually orthogonal Walsh codes can be selected from the set of 64 Walsh codes within a 64 by 64 Hadamard matrix. Also, a particular data signal can be separated from the other data signals by using a particular Walsh code to spread the particular data signal.

Further, it will be appreciated by those skilled in the art that spreading codes can be used to channel code data signals. The data signals are channel coded to improve performance of the communication system by enabling transmitted signals to better withstand the effects of various channel impairments, such as noise, fading, and jamming. Walsh codes can be used to channel code a data signal prior to modulation of the data signal for subsequent transmission. Other orthogonal or quasi-orthogonal methodology may also be used for modulation within the inventive method and apparatus for an equivalent implementation without straying from the intended scope of the present invention. In order to use Walsh codes in signal spreading or channel coding, the Walsh codes must be readily available for use. One technique for making the Walsh codes readily available is to generate the Walsh codes by placing the desired Walsh codes in a memory-based lookup table. Subsequently, as each Walsh code is needed, it must be retrieved from the lookup table.

The modulation used for the purposes of illustrating FIG. 1 is a Walsh code of four chips length. Each of the input channels 10, 11, 12 is bi-phase shift key (BPSK) modulated by a unique (and different) Walsh code from the four available. The modulation rate is synchronized to the normal CDMA chip rate, but is at 32 times this rate (i.e., 32 Fc). The effect of this (fast) Walsh code modulation on the normal CDMA chips is to produce a Sin(x)/x spectrum with sidebands separated by 32/4 =8 Fc centered at the carrier frequency. However, with the exception of the Walsh code zero, none of the other Walsh codes have spectral energy within the output duplexer's pass band. Consequently if such signals encounter a duplexer filter they will be reflected back from the input.

Figure 1A:
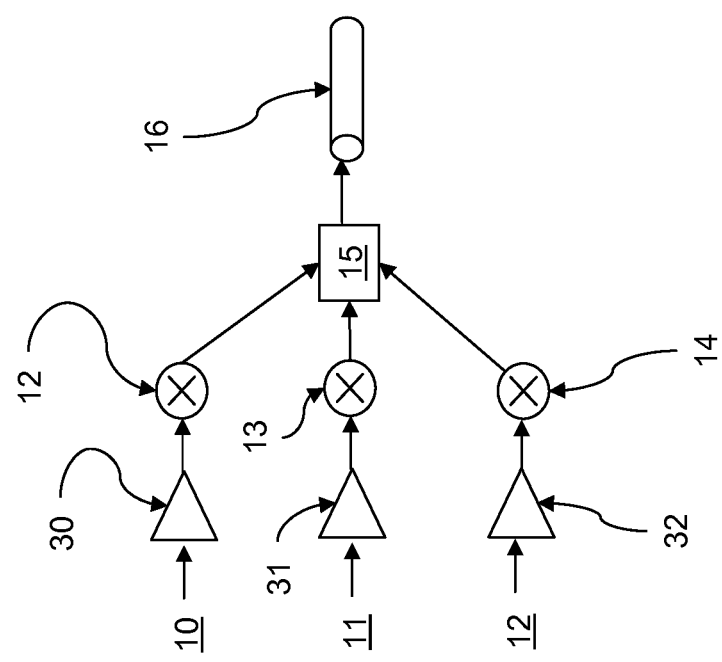
FIG. 1A is a block diagram illustrating a different input portion of the diagram shown in FIG. 1 including multiple amplifiers for a forward link configuration of the present invention.
Figure 1B:
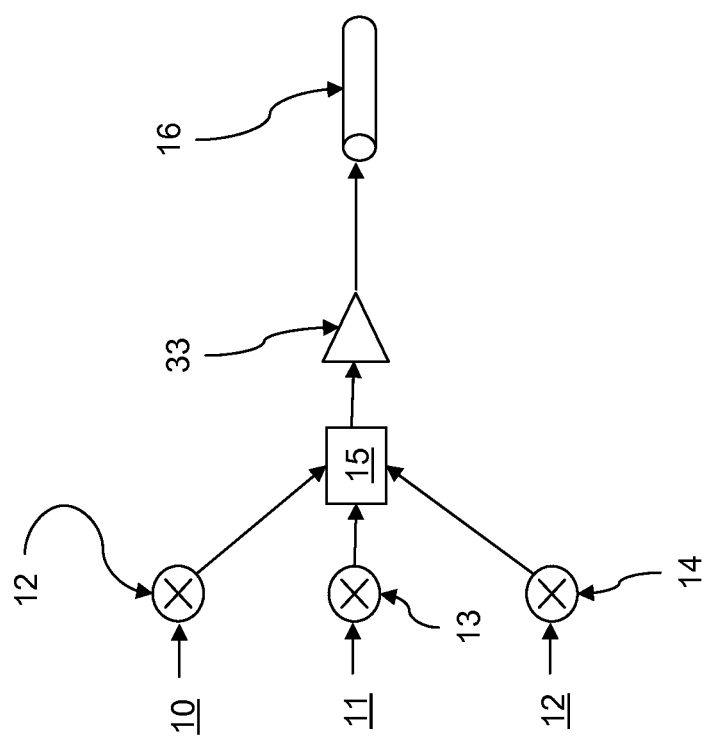
FIG. 1B is a block diagram illustrating another different input portion of the diagram shown in FIG. 1 including a single amplifier for a forward link configuration of the present invention.

With continued reference to FIG. 1, Walsh code modulated signals are then combined into one RF stream by a combiner 15. If forward link transmission occurs, then the input signals 10, 11, 12 may each be amplified prior to modulation by way of a corresponding high power amplifier (HPA) 30, 31, 32 as shown in FIG. 1A. Alternatively, a common HPA 32 placed after the combiner 15 as shown in FIG. 1B is also possible for the forward link implementation of the present invention. It is important to note that such combining allows a single RF cable 16 to be used between the one or more HPAs and the demodulation elements 13a, 14a located at the masthead (not illustrated). While a slightly larger cable is needed, windage and related structural upgrades to the antenna tower are significantly reduced by the use of only one cable 16. Initial experimental results indicate in regard to the present invention that the power losses in a single cable, depending upon the length of cable required can minimize or possibly outweigh the losses in increased demodulation.

The RF losses for the three paths illustrated will clearly be different. However, this variation can be compensated by differential gain adjustments for each sector prior to the HPA. Nevertheless, the extra RF circuitry at the high power regions will increase the overall losses compared to the standard MFRM by around 0.6 dB by way of the following example.

For example, the preliminary insertion loss calculations for a three sector single HPA modulated system are an average 0.63 dB. This calculation provides loss estimates relative to the standard losses incurred by an MFRM's HPA coupled through an isolator to a 1900 MHz duplexer. Such losses being referred to the duplexer output port. As a reference, each standard carrier can have a maximum power of 17 $W_{rms}$ at the HPA output. This 17 $W_{rms}$ then passes through a duplexer filter with a loss of 0.55 dB resulting in a power of 15 $W_{rms}$ out of the duplexer port. Assuming:

Beta sector delta losses=0.0 dB, due to the fact that the RF path after the HPA is identical to the standard MFRM RF path.

Alpha sector delta losses=0.1+0.15+0.15+0.2=0.6 dB=phase shifter loss+circulator loss to duplexer+circulator $2^{nd}$ pass loss+assorted micro-strip losses.

Beta sector delta losses=0.6+0.6=1.2 dB=alpha sector delta losses times two.

Average power loss for all three sectors=(beta losses+alpha losses+gamma losses) divided by three=$10*\log((10^{0.0}+10^{(0.6/10)}+10^{(1.2/10)})/3)$=0.63 dB.

It should be noted that that slightly unequal power outputs from the three duplexers could be compensated for with offsetting digital channel gain adjustments so that equal powers are available from each sector. Further, some of these RF losses can be recovered if the single RF cable is a lower loss cable than the multiple cables replaced by this scheme. In the FIG. 1 embodiment illustrated above for the three-sector arrangement, the loss difference must exceed 0.63 dB in order to "break even".

With further reference to FIG. 1, the RF signal is split into its three individual sector components and these signals 10a, 11a, 12a are output accordingly. Such splitting and reconstitution of the output signals 10a, 11a, 12a is accomplished without significant distortion or cross coupling. More specifically, the beta sector is shown modulated with the fast Walsh code zero (i.e., beta sector signal is unchanged from the original CDMA RF signal).

After transmission through the RF cable 16, the beta sector signal component will pass through a respective beta sector duplexer filter 22 normally. However, the alpha and gamma sector signal components are both out of band. Accordingly, the alpha and gamma sector signal components are reflected by the beta sector duplexer filter 22 and exit from the third port of the beta sector's circulator 20. This output of the third port of the beta sector's circulator 20 is the remaining signal consisting of fast Walsh modulated components of alpha and gamma signals. This remaining signal is then passed through the alpha sector demodulator 13a that re-constitutes the alpha sector signals to an in-band state. The alpha signal then passes through the alpha duplexer 21 and the gamma sector's energy (which is still out of band) is reflected from the alpha duplexer 21 towards the gamma demodulator 14a via the third port of the alpha sector's circulator 19. The final stage of the process occurs when the gamma sector's signal is re-constituted by the gamma demodulator 14a and passes through the gamma sector's duplexer 23. This linear path approach of the systematically filtered aggregate signal stream from the RF cable 16 through the circulator 20, modulator 13a, circulator 19, and then modulator 14a advantageously utilizes a minimum of circuit elements at the masthead.

Figure 1C:
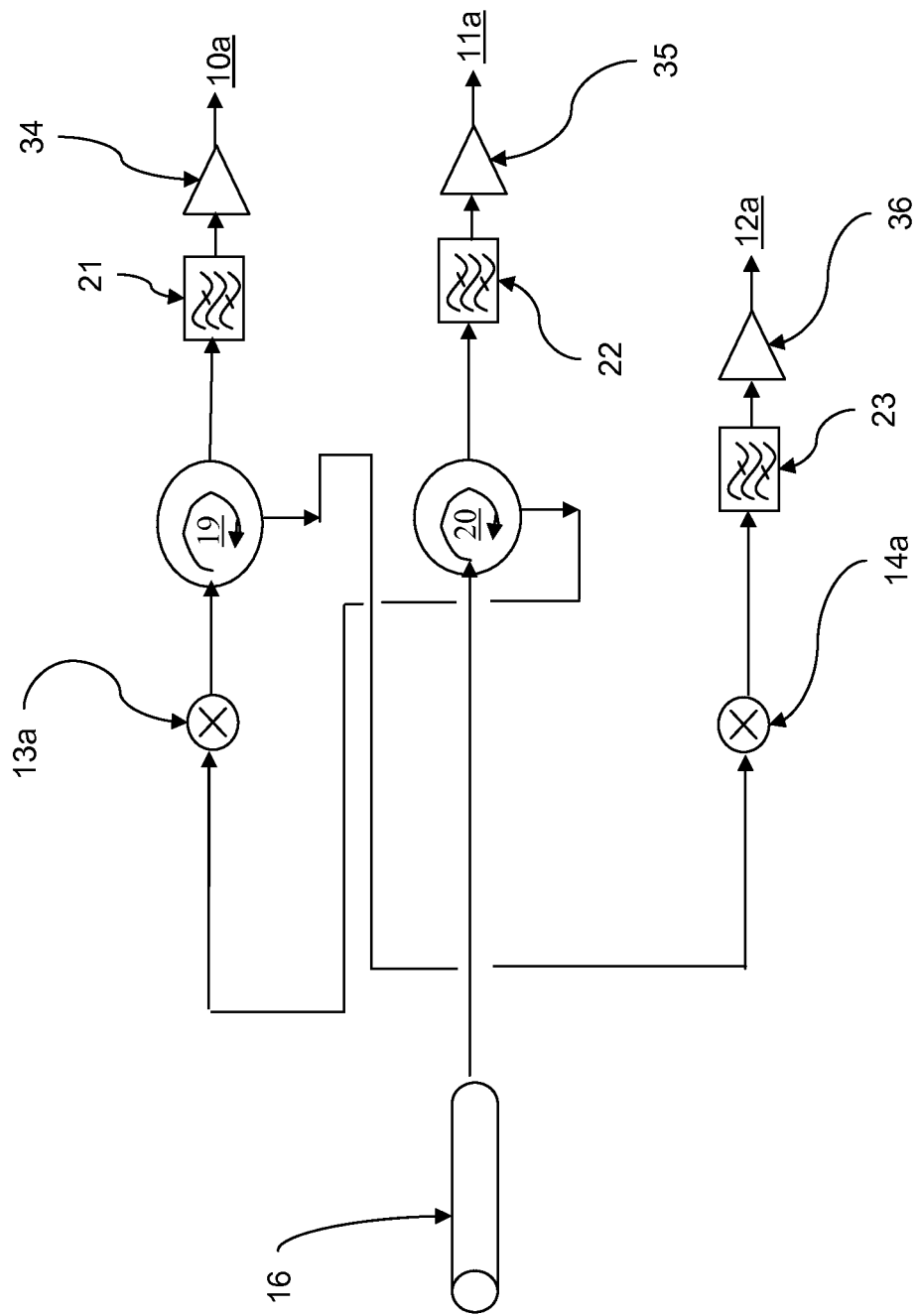
FIG. 1C is a block diagram illustrating a different output portion of the diagram shown in FIG. 1 including multiple amplifiers for a reverse link configuration of the present invention.

The final stage of the process occurs when the signals are re-constituted by the de-modulators 13a, 14a that are effectively identical in operation to the modulators 13, 14. Filters 21, 22, 23 further assure reconstituted output signals 10a, 11a, 12a are substantially identical to input signals 10, 11, 12 and free of any distortion. It should be readily understood that transmission may also be in the reverse link without straying from the intended scope of the present invention in addition to the forward link mentioned in regard to FIGS. 1A and 1B above. In such instance of reverse link transmission under the present invention, no HPAs would be used. Rather, low power preamplifiers 34, 35, 36 as shown in FIG. 1C would be required.

The modulators 13, 14, and demodulators, 13a, 14a illustrated include lambda/2 lines switched in or out by PIN diode switches controlled by clock signals derived from the MFRM's 32 Fc clocks. Consequently, there will be eight repetitions of the fast Walsh code sequences during every standard IS-95 chip length (i.e., 814 nS). While PIN diodes are described herein, it should be readily understood by those skilled in the art that any suitable switching element may be used.

It should be readily understood that reducing the conventional manner of using multiple HPAs and cables by way of the present invention reduces system costs in that the HPA is one of the costliest elements of the basestation. However, it should also be noted that multiple HPAs may still benefit by the demodulation configurations as outlined by the present invention as mentioned above as an alternative embodiment of this invention where amplification occurs before the combining operation indicated in FIG. 1A. The inventive arrangement of demodulation is made by a series of circulators and demodulators. By arranging the demodulation elements in series as opposed to splitting the aggregate signal into three at the antenna end of the tower, there is a resulting reduction in circuitry. This reduction in circuitry therefore creates a significant power savings from any other arrangement considered.

Further, it is within the intended scope of the present invention that even if multiple HPAs are used, the total number of HPAs can be reduced as the N:1 relationship of input signals to aggregate signals may occur anywhere in the system. Accordingly, a CDMA communications system and the like will still benefit from the 1:N relationship of the demodulation at the antenna end of the tower. In such instances, it is recognized that multiple cables would still be needed up the tower to the antenna, but the existence of HPAs at the masthead would be eliminated by the inventive demodulation apparatus and method.

Figure 2:
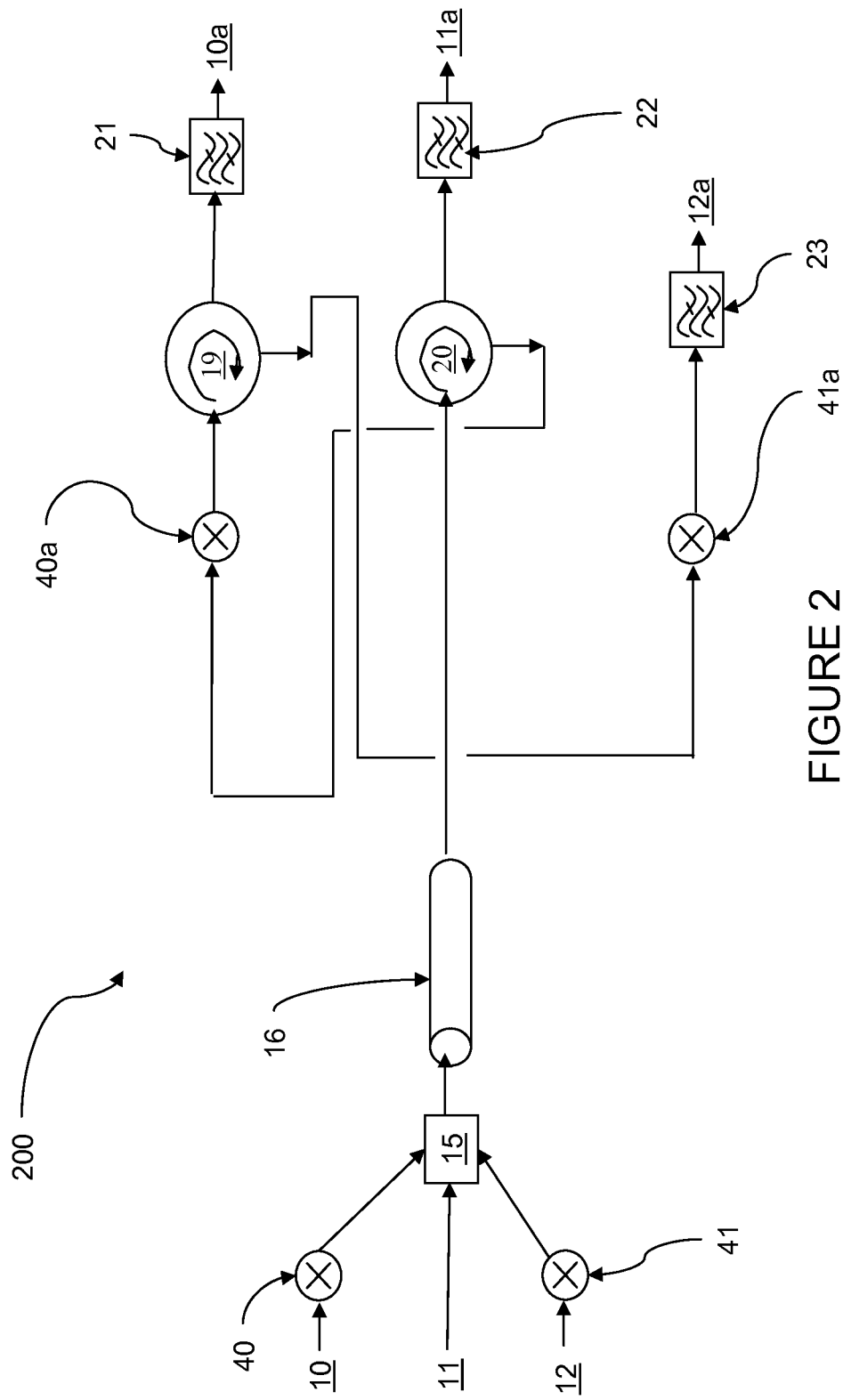
FIG. 2 is a schematic of a second embodiment of the present invention using phase shift modulation via a Serrodyne scheme.

With reference to the second embodiment 200 shown in FIG. 2, identical elements exist except that the modulators 40, 41, and demodulators 40a, 41a, are of the Serrodyne type. Serrodyne devices were originally used with radar systems to simulate moving targets. These devices include a phase shifter that linearly shifts phase over a 360-degree range. The rate of phase change determines the effective "Doppler" frequency response of the returned signal to the radar receiver and hence the simulated speed of the target. These devices can be single bit (0 and 180 degrees) or multi-bit phase shifters (e.g. three bit phases of 0, 45, 90, 135, 180, 225, and 270, and 315 degrees). In the present invention, the Serrodyne devices are used as low loss, high power RF frequency translators. The "one bit" phase shifter can be implemented with PIN diode switched lambda/N transmission lines.

In FIG. 2, the alpha sector signal 10 is offset by the Serrodyne modulator 40 by frequency F1, the beta sector signal is offset by F0 corresponding to a zero offset frequency (thus no modulator exists), and the gamma sector signal 12 is offset by the Serrodyne modulator 41 by frequency F2. In other words, the Serrodyne modulation results in a specific frequency shift delta of the original signal in either a positive or negative direction. The offset signals and un-modulated beta sector signal are combined by combiner 15 into a single aggregate RF signal. The aggregate RF signal is transmitted along a single RF cable 16. The three RF signals are separated by individual (i.e., different) offset frequencies. The beta sector as shown is the exception because it is unmodified as F0 corresponds to a zero offset frequency in this instance. The amplified aggregate signal is first sent through a three-port circulator 20 to the beta duplexer filter 22. Only the beta sector's signal (which is non-shifted from the original) will pass through the beta sector duplexer filter 22. The other two components will be reflected from the beta sector duplexer filter 22 and appear (with defined phases) at the third port of the beta sector circulator 20 which is connected to the input of the alpha sector phase shifter (i.e., Serrodyne demodulator 40a).

The alpha sector's high power (i.e., almost loss-less) Serrodyne demodulator 40a will modulate the composite waveform of alpha and gamma signals and effectively shift the alpha waveform's frequency to be within the pass band of the alpha duplexer filter 21. At this point, the alpha sector signals will pass through the alpha sector's duplexer filter 21. The gamma sector signal will be reflected from the alpha sector's duplexer filter 21 and exit out the third port of the alpha circulator 19. The process completes when the last remaining portion of the aggregate signal is frequency shifted by the gamma sector Serrodyne demodulator 41a, and its frequency is moved by F1-F2 to an in-band signal that in turn passes through the gamma sector's duplexer filter 23. In this manner, reconstituted signals 10a, 11a, 12a are output that correspond substantially similarly to input signals 10, 11, 12.

It should be readily apparent that the amplifier placements detailed above with regard to FIGS. 1, 1A, 1B, and 1C pertain to forward link and reverse link applications of the present invention as embodied by either FIG. 1 or FIG. 2.

Overall, the present invention provides communications systems such as, but not limited to, CDMA cellular systems with significant capacity improvements. These improvements are a direct result of base station sector trunking efficiencies beyond those obtainable from individual per sector power amplifiers. This results from the fact that, in CDMA cellular systems, mobile traffic distribution is normally unequally distributed across sectors. Consequently, one sector usually reaches its maximum power (i.e., maximum traffic) capability before the others and additional users are then blocked from access to the sector. However, the present invention allows RF power from the other under-utilized sectors to be re-routed to the heavily loaded sector. Accordingly, significantly greater offered traffic could be accommodated before blocking occurred which effectively increases the base station's maximum traffic capacity.

This invention enables all of the RF power from all of the sectors to be available at any sector to match any (arbitrary) sector traffic load combination. This process is automatic and consequently improves the base station's traffic capacity despite unbalanced sector loads. Further, reducing the number and size of antenna tower RF cables helps system operators control their capital expenditures by reducing the tower's reinforcing requirements. Also, in cases where the antenna tower is shared or leased by the system operators, the rental expenses often increase as cables are added. Importantly, in such situations system operators may be prevented from expanding the number of antenna tower cables (needed to support the traffic load increases). This of course, directly impacts future revenue improvements at those sites.

The problems noted above are exacerbated by the recent introduction of smart antenna systems that generally require significantly more RF cables than conventional systems especially when the HPAs are not mounted at the tower top. The present invention overcomes this by allowing base station RF interfaces to remain relatively simple (with only one or two transmitter and receiver ports per sector) and yet still be capable of interfacing and utilizing phased array systems having six, eight or more input and output ports.

It should be understood that the preferred embodiments mentioned here are merely illustrative of the present invention. Numerous variations in design and use of the present invention may be contemplated in view of the following claims without straying from the intended scope and field of the invention herein disclosed.

Having thus described the invention, what is claimed as new and secured by Letters Patent is:

1. An apparatus for processing N input signals having a common carrier frequency, the apparatus comprising:
   at least N−1 first frequency shifters operable to frequency shift at least N−1 of the N input signals to provide N signals having N distinct carrier frequencies, wherein N is greater than 2;
   a combiner operable to combine the N signals having distinct carrier frequencies into an aggregate signal;
   at least N−1 multiport circulator coupled to the combiner;
   at least N−1 filters; and
   at least N−1 second frequency shifters;
   wherein the at least N−1 multiport circulators, the filters and the second frequency shifters are coupled together in series and configured to separate and frequency shift the aggregate signal to reconstitute the N input signals having a common carrier frequency.

2. The apparatus as defined in claim 1, wherein the at least N−1 circulators are coupled to the combiner, each of the at least N−1 filters are coupled to a respective one of the N−1 circulators, and each of the at least N−1 second frequency are being coupled to a respective one of the at least N−1 circulators.

3. The apparatus as defined in claim 2, wherein the N−1 circulators are each coupled to a respective one of the N−1 filters and each of the N−1 circulators is co-operable with its respective filter to separate a respective one of the N signals having a respective one of the carrier frequencies from the aggregate signal.

4. The apparatus as defined in claim 3, wherein one or more of the N−1 circulators are each coupled to a respective one of the N−1 filters and a respective one of the N−1 second frequency shifters, and each of the N−1 second frequency shifters is operable to shift a respective component of the aggregate signal from one of the N distinct carrier frequencies to the common carrier frequency.

5. The apparatus as defined in claim 4, wherein the N−1st circulator is coupled to an additional one of the N−1 filters and an additional one of the N−1 second frequency shifters, the additional second frequency shifters being operable to shift another component of the aggregate signal from another of the N distinct carrier frequencies to the common carrier frequency.

6. The apparatus as defined in claim 3, wherein a first of the N−1 circulators is coupled to a respective one of the N−1 filters to separate from the aggregate signal a component of the aggregate signal having the common carrier frequency.

7. The apparatus as defined in claim 2, wherein each of the N−1 circulators has an input port for receiving an input signal having plural components having respective carrier frequencies, an intermediate port for coupling the input signal to a respective one of the N−1 filters, the respective filter being operable to pass one of the plural components having a respective one of the carrier frequencies and to reflect all other components of the input signal back into the intermediate port for coupling to an output port of the circulator.

8. The apparatus as defined in claim 7, wherein the output port of a first of the N−1 circulators is coupled to an input port of a next of the N−1 circulators.

9. The apparatus as defined in claim 8, wherein one or more of the N−1 circulators each have a respective second frequency shifter coupled to their respective input port, the respective second frequency shifter being operable to shift a respective component of the aggregate signal from one of the N distinct carrier frequencies to the common carrier frequency.

10. The apparatus as defined in claim 9, wherein the output port of the N−1st circulator is coupled to a second one of the N−1 filters and a second one of the N−1 second frequency shifters, the second one of the second frequency shifters being operable to shift another component of the aggregate signal from another of the N distinct carrier frequencies to the common carrier frequency.

11. The apparatus as defined in claim 1, wherein the at least one multiport circulator is coupled to the combiner by a cable.

12. The apparatus as defined in claim 11, wherein the cable spans at least a portion of an antenna structure.

13. The apparatus as defined in claim 1, further comprising a plurality of amplifiers each located such that said input signals pass through a respective one of said plurality of amplifiers prior to passing through said at least N−1 number of first frequency shifters.

14. The apparatus as defined in claim 13, wherein the input signals are forward link transmissions and the plurality of amplifiers are high power amplifiers.

15. The apparatus as defined in claim 13, wherein the input signals are reverse link transmissions and the plurality of amplifiers are low power preamplifiers.

16. The apparatus as defined in claim 1, wherein the input signals are forward link transmissions and the apparatus further comprises a single high power amplifier operable to amplify the aggregate signal.

17. A method for processing N input signals having a common carrier frequency, the method comprising:
frequency shifting at least N−1 of the N input signals to provide N signals having N distinct carrier frequencies, wherein N is greater than 2;
combining the N signals having distinct carrier frequencies into an aggregate signal;
coupling together in series and applying the aggregate signal to the at least N−1 multiport circulators, at least N−1 filters, and at least N−1 frequency shifters;
wherein the circulators, the filters and the frequency shifters separating and frequency shifting the aggregate signal to reconstitute the N input signals having a common carrier frequency.

18. An apparatus for frequency shifting and separating an aggregate signal comprising N signal components each having a respective carrier frequency, wherein N is greater than 2, the apparatus comprising:
at least N−1 multiport circulator configured to receive the aggregate signal;
at least N−1 filters; and
at least N−1 frequency shifters;
wherein the at least N−1 multiport circulators, the filters and the frequency shifters are coupled together in a series configuration and configured to separate and frequency shift the aggregate signal to provide N output signals having a common carrier frequency.

19. The apparatus as defined in claim 18, wherein each of the at least N−1 filters being coupled to a respective one of the N−1 circulators, and each of the at least N−1 frequency shifters being coupled to a respective one of the at least N−1 circulators.

20. The apparatus as defined in claim 19, wherein the N−1 circulators are each coupled to a respective one of the N−1 filters and each of the N−1 circulators is co-operable with its respective filter to separate a respective one of the N signals having a respective one of the carrier frequencies from the aggregate signal.

21. The apparatus as defined in claim 20, wherein one or more of the N−1 circulators are each coupled to a respective one of the N−1 filters and a respective one of the N−1 frequency shifters, and each of the N−1 frequency shifters is operable to shift a respective component of the aggregate signal from one of the N distinct carrier frequencies to the common carrier frequency.

22. The apparatus as defined in claim 21, wherein the N−1st circulator is coupled to an additional one of the N−1 filters and an additional one of the N−1 frequency shifters, the additional frequency shifter being operable to shift another component of the aggregate signal from another of the N distinct carrier frequencies to the common carrier frequency.

23. The apparatus as defined in claim 20, wherein a first of the N−1 circulators is coupled to a respective one of the N−1 filters to separate from the aggregate signal a component of the aggregate signal having the common carrier frequency.

24. The apparatus as defined in claim 19, wherein each of the N−1 circulators has an input port for receiving an input signal having plural components having respective carrier frequencies, an intermediate port for coupling the input signal to a respective one of the N−1 filters, the respective filter being operable to pass one of the plural components having a respective one of the carrier frequencies and to reflect all other components of the input signal back into the intermediate port for coupling to an an output port of the circulator.

25. The apparatus as defined in claim 24, wherein the output port of the first N−2 circulators is coupled to an input port of a next of the N−1 circulators.

26. The apparatus as defined in claim 25, wherein N−2 of the circulators each have a respective frequency shifter coupled to their respective input port, the respective frequency shifter being operable to shift a respective component of the aggregate signal from one of the N distinct carrier frequencies to the common carrier frequency.

27. The apparatus as defined in claim 26, wherein the output port of the N−1st circulator is coupled to a second one of the N−1 filters and a second one of the N−1 frequency shifters, the second frequency shifter being operable to shift another component of the aggregate signal from another of the N distinct carrier frequencies to the common carrier frequency.

* * * * *